Figure 1:
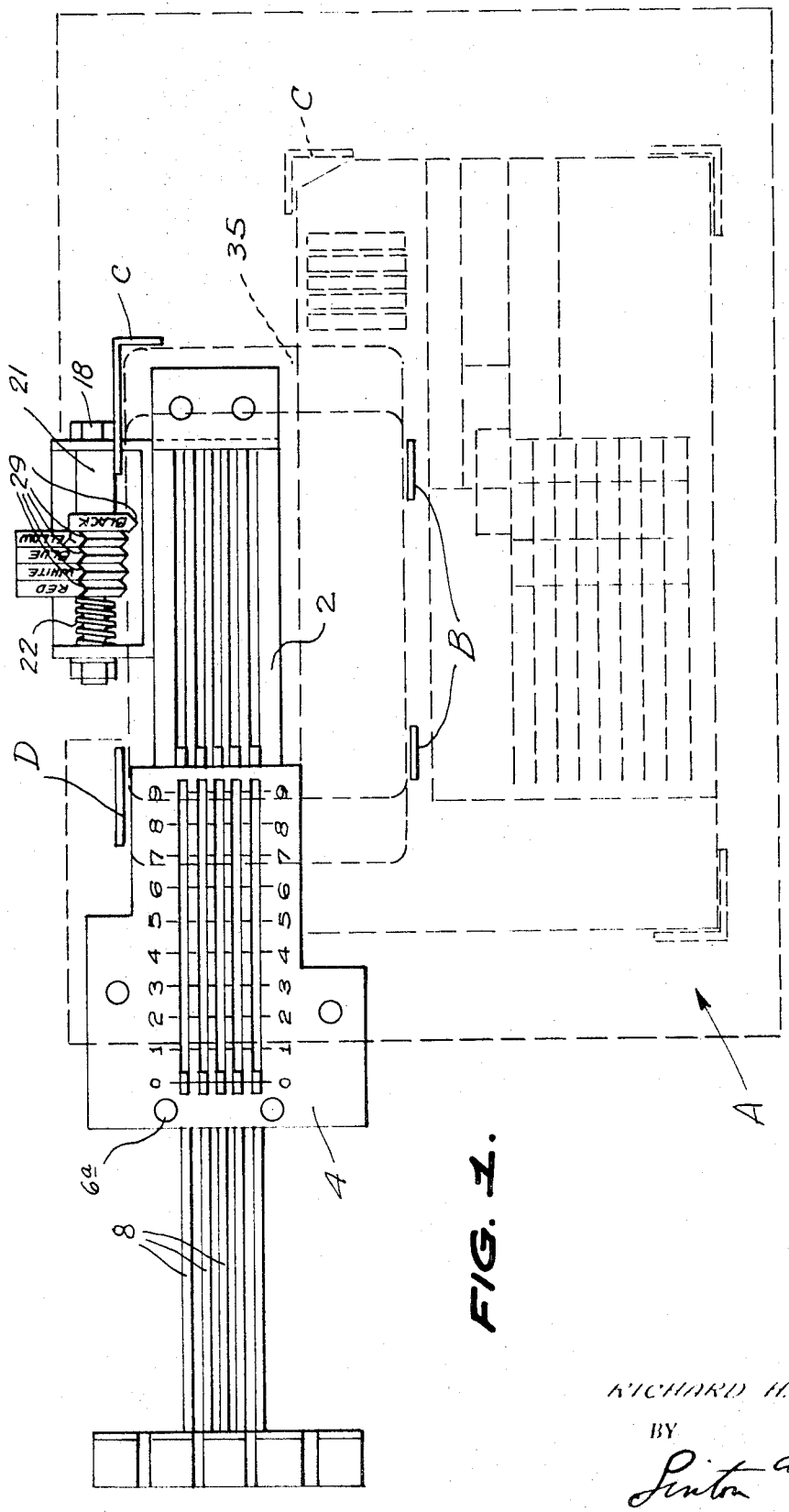

3,585,593

[72] Inventor Richard H. Roberts
Route 4, Box 368-7, Tallahassee, Fla. 32301
[21] Appl. No. 864,803
[22] Filed Oct. 8, 1969
[45] Patented June 15, 1971

[54] DEVICE FOR IDENTIFYING CODED CREDIT CARDS
9 Claims, 6 Drawing Figs.
[52] U.S. Cl. .................................................. 340/149,
340/147
[51] Int. Cl. ........................................................ H04q 1/00

[50] Field of Search ........................................... 340/149, 149 A

[56] References Cited
UNITED STATES PATENTS
3,154,761  10/1964  O'Gorman ................. 340/149 A

*Primary Examiner*—Harold I. Pitts
*Attorney*—Linton and Linton

ABSTRACT: The present device is an attachment for an improvement in credit card writing machines. The device identifies a credit card submitted for use on each machines as being in accordance with information known to the proper owner thereof to prevent the unauthorized use of such cards.

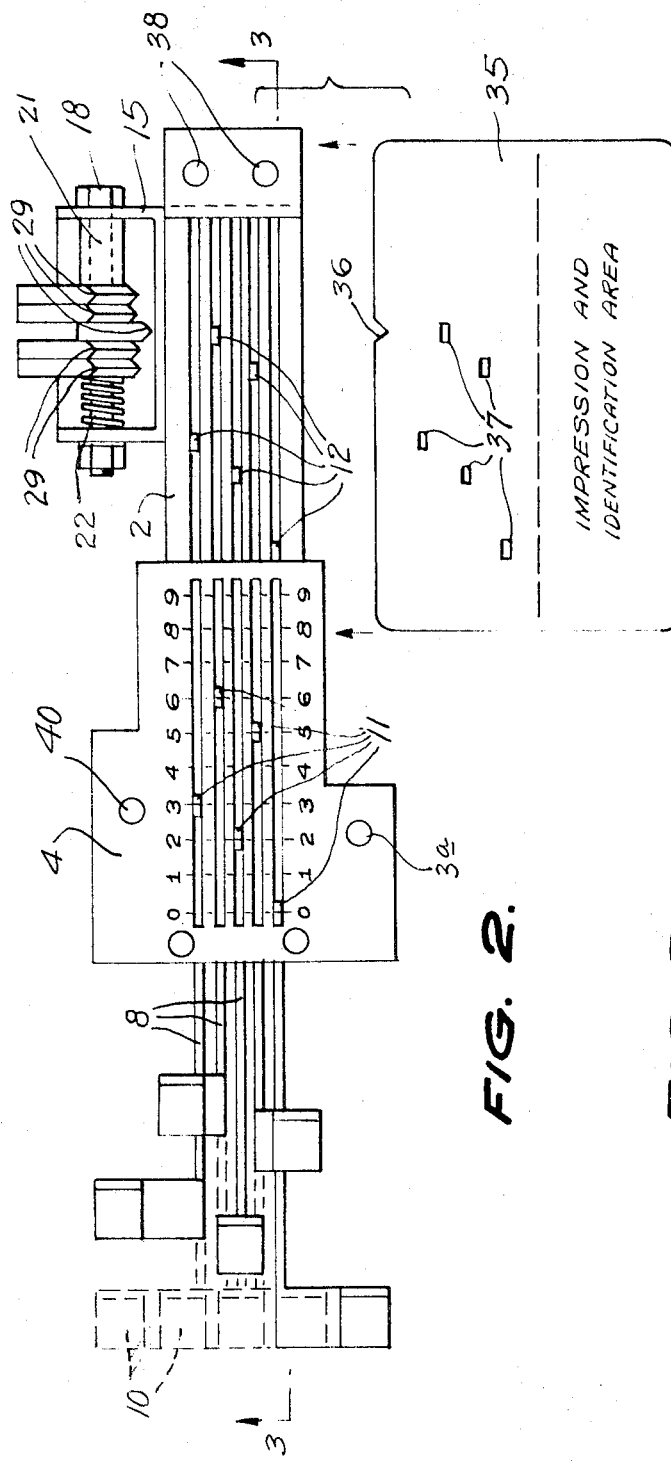
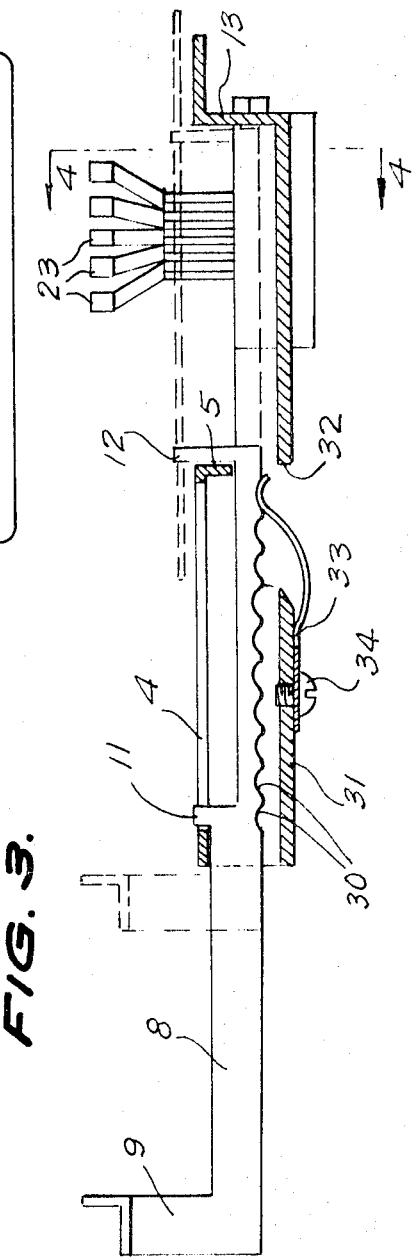
FIG. 2.
FIG. 3.

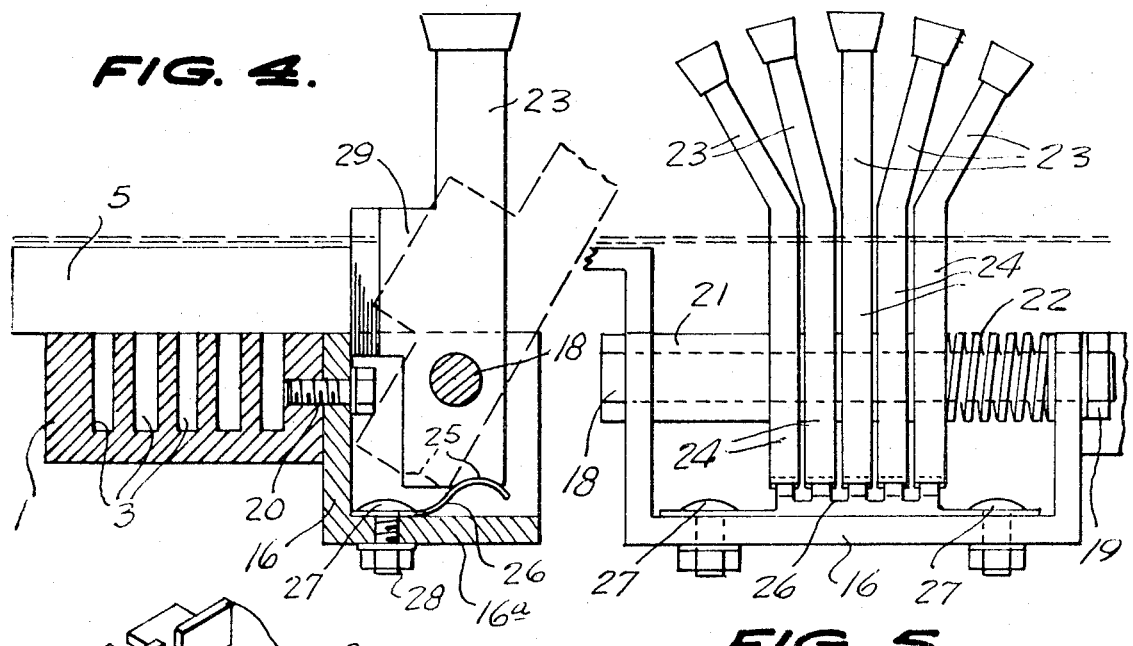
FIG. 4.
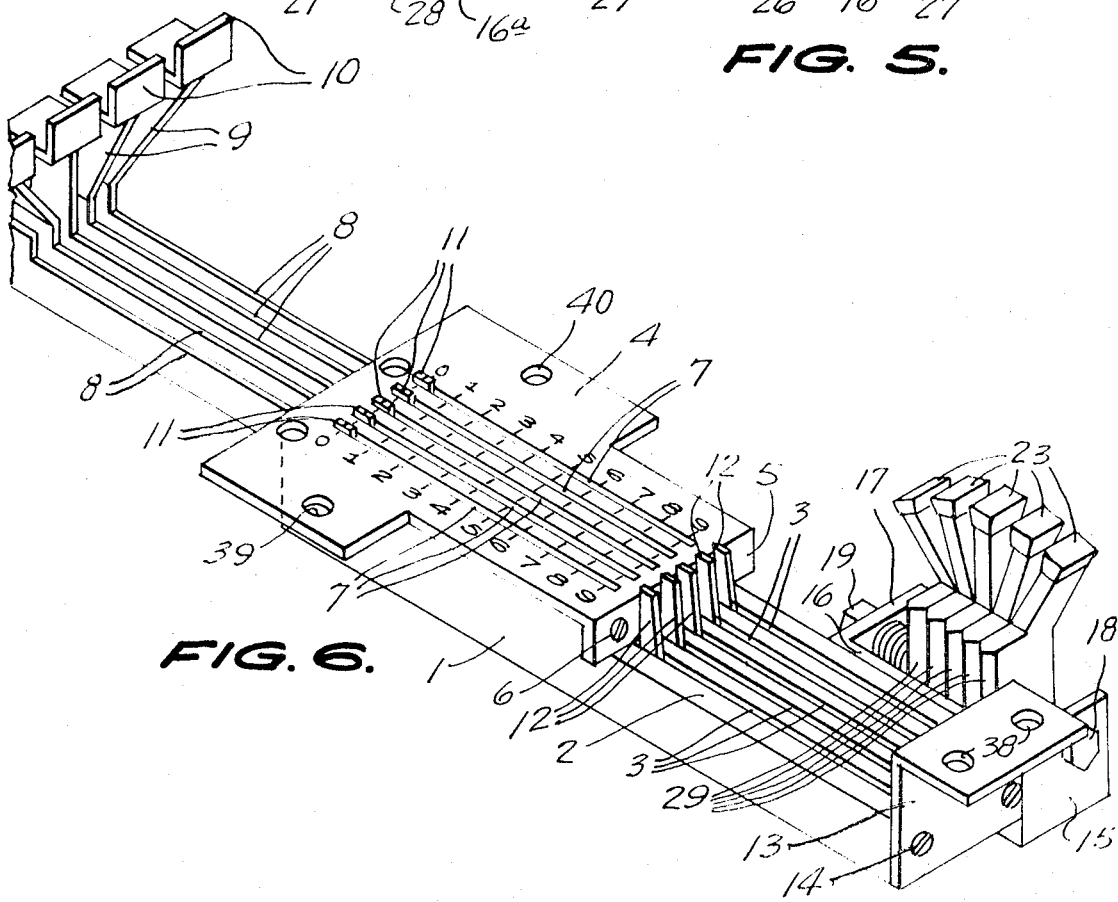
FIG. 5.
FIG. 6.
INVENTOR
RICHARD H. ROBERTS,
BY
Linton and Linton
ATTORNEYS

DEVICE FOR IDENTIFYING CODED CREDIT CARDS

The present device is for identifying credit cards.

The principal object of the present invention is provide a device which will identify a coded credit card as being in accordance with information known to the legal owner thereof and will reject cards not properly identified by the possessor thereof to prevent the illegal use of credit cards.

It is a further important object of the present invention to provide a coded credit card identifying apparatus readily attachable to or capable of being a part of a credit card printing machine and which apparatus can also support uncoded credit cards as well as the coded cards in the printing of sales slips and the like on the printing machine.

Further objects of the invention will be in part obvious and in part pointed out in the following detailed description of the accompany drawings, in which, FIG. 1 is a top view of the present credit card identifying apparatus mounted on a credit card printing machine, FIG. 2 is a top exploded view of the present credit card identifying apparatus with the elements thereof positioned for identifying the credit shown in an enlarged top view thereof, FIG. 3 is a longitudinal sectional view taken on line 3–3 of FIG. 2, FIG. 4 is an enlarged cross-sectional view taken on line 4–4 of FIG. 3, FIG. 5 is a view seen from the right of FIG. 4

And FIG. 6 is a perspective view of the present apparatus with the elements thereof in position for supporting an uncoded credit card.

Referring now more particularly to the accompanying drawings wherein like and corresponding parts are designated by similar reference characters, A in FIG. 1 generally indicates a conventional credit card printing machine such as for example those produced by the Addressograph Multigraph Corporation or other companies. Spring-type credit card guides B are supported on the printing machine and can be depressed when the inking roller (not shown) passes over the credit card. Credit card guides C and D cooperate with guides B to limit the lateral movement of the credit card 35.

The present credit card identifying apparatus has an elongated block 1 whose stepped top face 2 has a series of longitudinal slots 3 therein for the length of said block.

A plate 4 is mounted on the top step of face 2 and has a normally extending base 5 positioned on the riser of face 2 with screws 6 therethrough and screws 6a through plate 4 into block 1 for attaching said plate on said block. Plate 4 further has a series of slots 7 therethrough each in line with one of said slots 3. Plate 4 also has numbered lateral lines across said slots 7.

A plurality of slides 8 are each slideably positioned in one of said block slots 3 and each have an upright leg 9 with a key 10 affixed thereto. Said slides further each have an intermediate marker finger 11 and a feeler 12 at the end thereof opposite the leg 9. Fingers 11 each extend through one of the slots 7 in plate 4 while feelers 12 extend above slots 3 in the lower step of face 2.

An end plate 13 is attached by screws 14 to the end of block 1 closing off slots 3.

A U-shaped bracket having base 16 and legs 15 and 17 has a blot 18 extending through said legs and retained thereon by nut 19. Screws 20 retain base 16 to the side of block 1. A tubular spacer 21 has bolt 19 extending therethrough as does coil spring 22.

Between spacer 21 and spring 22 there is a plurality of locater key handles 23 which also have bolt 19 extending through the legs 24 thereof pivotally supporting said keys. Each key leg has a curbed recess 25 in the bottom thereof.

Said bracket has a bottom 16a on which is mounted a split spring 26 by means of bolts 27 and 28. Each finger of said split spring presses against the bottom of one of said legs 24 and when in the recess 25 thereof will retain the leg upright.

Each leg 25 has a side 29 of a V cross-sectional configuration facing block 1. Each slide 8 has a series of bottom notches 30 spaced apart in relation to the numbered lines on plate 4.

Block 1 has bottom 31 with an opening or openings 32 in each slot 3 thereabove. A split spring 33 is attached to said bottom 31 by screws 34 and has fingers extending through opening 32 with each finger pressing against the notched edge 30 of one of said slides 8.

A coded credit card 35 has a side notch 36 and a plurality of openings 37 arranged therethrough in accordance with a code.

End plate 13 has an extension with openings 38 for attachment by screws (not shown) to the credit card printer A and likewise plate 4 has openings 39 and 40 for attachment by screws (not shown) to the printer or the present apparatus may be a part of the printer.

In the use of the present credit card identifying apparatus, a coded credit card has openings 37 laterally spaced therein in accordance with the spacing of slots 3 and longitudinally in relation to certain of the numbered lines on plate 4 and one of the key edges 29. The notch 36 for all coded cards is always in the same place on the card. The credit card is punched in accordance with the code given the legal owner thereof. When presenting the card to the credit card printing machine operator, the card holder gives code to the operator who sets the identifying apparatus in accordance with the code given and places the credit card on face 2 between guides B, C and D, plate 13 and base 5. To set the identifying apparatus, the operator moves only one of the keys 24 upright which corresponds to a color or otherwise identifying part of the code and moves one or more of the slides 8 so that the finger 11 of each slide will be in alignment with the line of plate 4 whose number agrees with a number of the code. The corresponding finger of spring 33 will retain the slide at that position. Thereupon the upright key 24 will engage card slot 36 and the feeler 12 of each moved slide 8 should enter an opening 37 of the card if the correct code is given.

For example, if the credit card is prepared to use the code Blue 36250, the identifying apparatus operator would move the Blue key 24 upright and move the slides 8 until the finger 11 would be positioned on the lines 3, 6, 2, 5 and 0 of Plate 4 as viewed from the top to the bottom of FIG. 2. The feelers 12 should then enter slots 37 of card 35, but if they do not the operator will be warned that the possessor of the card does not know the code for the card. However if the card 35 lines up properly with the feelers 12, a delivery or sales ticket can be impressed properly thereon.

The slides 8 can be resilient, that is, for example, spring steel or plastic, and thus if an operator selects a code with less than five numbers, such as Blue 362, for example, the bottom two feelers 12 of FIG. 2 would not interfere with the use of the card 35 as the feelers 12 will depress when the apparatus is locked for the inking roller to pass during the printing of the ticket on the credit card.

As a further preventative for the unauthorized use of the credit card, the last number of the code could be the last numeral in the birth date of the credit card owner. Thus, if the owner was born on Sept. 15th, the last number of the code would be 5, and if the 20th, then the last number would be 0, and so forth. If the printing machine operator is in doubt, as to the right person having the credit card, he may ask the credit card possessor his birth date and ask to see his driver's license as proof thereof. Cards having this feature could be identified with a "B," or other appropriate symbol, impressed at some position on the card 35 or a particular color on the card.

As a still further safeguard, the credit card 35 could have some "confusion" holes of the same type and size as the code holes 37 punched into the card. These "confusion" holes would be so arranged that they would not fit any code simply by changing the spacing of these "confusion" holes left to right or up and down on the card.

With the feelers 12 in their back position as shown in FIG. 6 and the fingers at their zero position, conventional uncoded credit cards could be used on the lower step of face 2 for the printing of a sales or delivery ticket on the credit card by the printing machine.

It is to be appreciated that any number of slides 8 and card locaters 23 from one to the amount the machine can accommodate can be used and the device is not limited to the five shown on the drawings.

I claim:

1. An apparatus for identifying a credit card having coded openings therein and a side recess comprising a block having a series of slots therein, a plurality of slides each slidably positioned in one of said slots, each slide having an intermediate finger and an end feeler extending from said block, said block having a face with indicia thereon for indicating various positions of said fingers along their block slots, a plurality of keys pivotally mounted alongside said block adjacent said slide feelers whereby one of said keys can engage the side recess of a coded credit card positioned on said block face and only when said fingers are positioned relative to said block indicia in accordance with said card code, said feelers will enter the coded openings in said credit card.

2. An apparatus for identifying a credit card having coded openings therein a side recess as claimed in claim 1 wherein said block face is stepped and said fingers extend from one step thereof and said feelers extend from another step, a plate having slots corresponding to said block slots is mounted on said first step with said fingers extending through said plate slots and said indicia is numbered lines extending across said plate slots.

3. An apparatus for identifying a credit card having coded openings therein and a side recess as claimed in claim 1 wherein said block is elongated with said slots extending longitudinally thereof, said slots are closed at one end of said block and said slides extend lengthwise of said slots and beyond the other end of said block.

4. An apparatus for identifying a credit card having coded openings therein and a side recess as claimed in claim 1 wherein said slides have recessed edges at the bottoms of said slots and resilient fingers are connected to said block and bear against said slides recessed edges for entering said recesses and retaining each slide in a given position.

5. An apparatus for identifying a credit card having coded openings therein and a side recess as claimed in claim 1 wherein each of said keys has an edge facing said block and capable of entering said credit card side recess when said key is in a given position and resilient means tending to retain each key in said given position.

6. An apparatus for identifying a credit card having coded openings therein and a side recess as claimed in claim 5 wherein said resilient means consists of resilient fingers fixedly mounted at one end and each having its other end bearing against an end of one of said keys and each of said keys having a recess in said end thereof for receiving its respective resilient finger therein.

7. An apparatus for identifying a credit card having coded openings therein and a side recess as claimed in claim 1 wherein a bracket is attached to said block, a bolt is supported by said bracket and said keys have said bolt extending therethrough providing the pivotal support thereof and resilient means on said bolt tends to press said keys together restricting the pivoting thereof.

8. A credit card identifying device comprising in combination a block having a credit card supporting face and an indicia marked face contiguous with said supporting face, said block having a series of slots extending across both said faces, slides each slideably positioned in one of said slots and having intermediate fingers extending from said indicia marked face and feelers extending from said credit card supporting face, keys pivotally mounted said block adjacent said credit card supporting face and each capable of pivoting to and from said credit card supporting face and a credit card having a side recess for receiving one of said keys therein when said card is mounted on said block credit card supporting face and openings arranged according to a code for receiving at least some of said feelers therethrough when said slide fingers are aligned with such of said indicia as corresponds to said code.

9. A credit card identifying device as claimed in claim 8, wherein said slides are resilient and said slots are of a configuration for receiving said feelers therein when depressed whereby a card can depress such of said feelers as do not enter said card openings.